(12) United States Patent
Potyrailo et al.

(10) Patent No.: US 6,809,817 B2
(45) Date of Patent: Oct. 26, 2004

(54) METHOD AND APPARATUS FOR IN SITU DETERMINATION OF MOLTEN POLYCARBONATE COMPOSITION USING ELECTRONIC ABSORPTION SPECTROSCOPY

(75) Inventors: Radislav Alexandrovich Potyrailo, Niskayuna, NY (US); Patrick Joseph McCloskey, Watervliet, NY (US); James Day, Scotia, NY (US)

(73) Assignee: General Electric Company, Schenectady, NY (US)

( * ) Notice: Subject to any disclaimer, the term of this patent is extended or adjusted under 35 U.S.C. 154(b) by 139 days.

(21) Appl. No.: 09/682,365

(22) Filed: Aug. 24, 2001

(65) Prior Publication Data

US 2003/0053050 A1 Mar. 20, 2003

(51) Int. Cl.⁷ .............................. G01J 3/28; G01N 21/00
(52) U.S. Cl. ...................................... 356/326; 356/433
(58) Field of Search ................................. 356/300–334, 356/416, 417, 432, 433; 250/306, 307, 458.1, 459.1, 461.1, 462.1; 436/106–118, 124–126, 82.05

(56) References Cited

U.S. PATENT DOCUMENTS

| | | | |
|---|---|---|---|
| 4,573,761 A | * 3/1986 | McLachlan et al. | 385/115 |
| 4,802,761 A | * 2/1989 | Bowen et al. | 356/301 |
| 4,907,883 A | 3/1990 | Allmon et al. | 356/317 |
| 5,131,746 A | * 7/1992 | O'Rourke et al. | 356/319 |
| 5,151,491 A | 9/1992 | Sakashita et al. | 528/199 |
| 5,550,630 A | * 8/1996 | Chrastil | 356/300 |
| 5,574,232 A | 11/1996 | Davidson et al. | 73/864.81 |
| 5,610,836 A | * 3/1997 | Alsmeyer et al. | 702/27 |
| 5,657,404 A | * 8/1997 | Buchanan et al. | 385/12 |
| 5,857,462 A | * 1/1999 | Thomas et al. | 600/310 |
| 6,166,133 A | 12/2000 | Catsman | 525/67 |
| 6,184,334 B1 | 2/2001 | McCloskey et al. | 528/196 |
| 6,193,850 B1 | * 2/2001 | Potyrailo et al. | 204/157.15 |
| 6,252,035 B1 | 6/2001 | McCloskey et al. | 528/196 |
| 6,461,872 B1 | * 10/2002 | Sivavec et al. | 436/112 |

FOREIGN PATENT DOCUMENTS

EP     0 985 696 A1     3/2000

OTHER PUBLICATIONS

Blair, D.S., et al., *Anal Chem.*, 69:2238–2246 (1997).
Chalmers, J.M., Everall, N.J., *Trends Anal. Chem.*, 15:18–25 (1996).
Everall, N.J. et al., *Appl. Spectrosc.* 49:610–615 (1995).
H. Mark, and J. Workman, *Statistics in Spectroscopy*: Academic Press: San Diego, CA, pp. 263–276 (1991).
Ingle, J.D., Jr., Crouch, S.R., *Spectrochemical Analysis*, Prentice Hall: Englewood Cliffs, N.J. (1988).
King, J. A., *Synthesis of Polycarbonates, in* Handbook of Polycarbonate Science and Technology, eds. D. G. LeGrand and J. T. Bender; Marcel Dekker, Inc., N.Y.
Miller, J.C., Miller, J. N., *Statistics for Analytical Chemistry*, Ellis Horwood, New York, NY, pp. 101–139 (1993).
Mork, C. O., Priddy, D. B, *J. Appl. Polym. Sci.*, 45:435–442 (1992).
Robertson, G., *Appl. Spectrosc.*, 55:98–104 (2001).

\* cited by examiner

*Primary Examiner*—Michael P. Stafira
(74) *Attorney, Agent, or Firm*—Kilpatrick Stockton LLP; Charles W. Calkins; Cynthia B. Rothschild

(57) ABSTRACT

The present invention relates to methods and devices for in-situ measurement of reaction components of interest during manufacturing of polycarbonate by melt polymerization. The present invention describes irradiating a molten polymer sample with UV/visible light, and generating an absorbance profile correlated to Fries products as well as uncapped phenolic groups in the sample. The methods and apparatus of the invention are suitable for monitoring of Fries products in reactions ranging in size from small scale combinatorial formats to production scale reactors. Also included in methods of the invention are univariate and multivariate analysis for prediction of linear Fries, branched Fries and uncapped phenolic end-groups in unknowns.

83 Claims, 9 Drawing Sheets

METHOD AND APPARATUS FOR IN SITU DETERMINATION OF MOLTEN POLYCARBONATE COMPOSITION USING ELECTRONIC ABSORPTION SPECTROSCOPY

BACKGROUND OF INVENTION

The invention relates to the noninvasive measurement of polymer composition by electronic absorption spectroscopy. In particular, the invention describes methods and devices for in-situ analysis of molten polycarbonate by a combination of UV/visible absorbance spectroscopy and multivariate data analysis.

The melt (LX) polymerization process utilizing bisphenol A (BPA) and diphenyl carbonate (DPC) is one of the most efficient non-phosgene routes of polycarbonate production. Still, the formation of Fries rearrangement products during melt polymerization can be problematic. Fries rearrangement products result from the conversion of phenolic esters into corresponding ortho and para hydroxyketones as a result of the inherent stability of polybenzenoid compounds. Polycarbonates produced by the melt process typically have higher Fries content than polycarbonates produced by the interfacial method. Excess Fries product can lead to differences in physical properties, such as flow and ductility, between polycarbonate produced by the melt process and polycarbonate produced by more traditional interfacial methods. It is important, therefore, to monitor and control for excess Fries produced during polymerization. In addition, in many cases it is also important to monitor the amount of "uncapped" polymer chains. Uncapped polymer chains are those chains which terminate in a free phenolic group, as opposed to being terminated with an aryl carbonyl group. It has been found that the hydrolytic stability of polycarbonate is inversely proportional to the amount of uncapped chain ends. Thus, a method which provides accurate analysis of Fries products and the amount of uncapped chain ends would be of value for the optimization of polymerization reaction conditions, both in the research setting and for on-line monitoring at the production scale.

Conventional techniques for monitoring Fries products generally involve analyzing aliquots from the reaction mixture by methods such as liquid chromatography (LC), or nuclear magnetic resonance (NMR). Similarly, techniques employed for the analysis of phenolic end-groups include IR spectroscopy, proton NMR, and potentiometric titration. These and other known methods of laboratory analysis, however, are time consuming and/or require relatively large sample sizes. Furthermore, these methods are not well-suited to on-line analysis of polycarbonate formed during large-scale polycarbonate production in that they require multiple sample preparation steps which are time-consuming, add to the overall error, are potentially dangerous at the high temperatures used for polymerization, and are not easily adaptable for remote monitoring using optical fibers. Also, removing aliquots may alter the reaction conditions or sample constitution, and provides only temporally discrete data points, rather than a continuous profile.

As an alternative to monitoring reactions during the polymerization, samples may be analyzed after the reaction is complete, and unsatisfactory products discarded. For example, a known technique for monitoring phenolic end-groups employs ultraviolet (UV) absorption spectroscopy to measure absorbance of phenolic end-groups at about 287 nm. Another technique for monitoring phenolic end-groups employs ratiometric ultraviolet absorption spectroscopy where absorbance of carbonate units in the spectral region of about 266 or 272 nm is compared to the absorbance of phenolic end-groups at about 287 nm. The measurements are typically performed by dissolving the polymer in a suitable solvent followed by UV spectrophotometric analysis or by a gel permeation chromatography and UV analysis (E. Shchori and J. E. McGrath, *J. Appl. Polym. Sci., Appl. Polym. Symp.,* 34:103–117 (1978); C. O. Mork and D. B. Priddy, *J. Appl. Polym. Sci.,* 45:435–442 (1992). Post-reaction sampling, however, does not enable real-time optimization of reaction parameters and, therefore, may result in the synthesis of a polymer batch of substantially inferior quality.

Thus, there is a need for an on-line method for optimization of production-scale polycarbonate synthesis. The method should eliminate the need for direct sampling and allow for the generation of continuous data. Also, the method should enable optimization of the overall melt polymerization process and improve plant capability. Similarly, there is a continuing need to evaluate economically superior reactant systems. Thus, the method should be adaptable to combinatorial (small-scale) evaluation of new reactant and catalyst combinations, as well as production-scale reactant systems.

SUMMARY OF INVENTION

The present invention relates to methods and devices for in-situ measurement of multiple reaction components of interest in molten polymer. The methods and devices described herein are suitable for measuring reaction components such as Fries products and uncapped phenolic end-groups in molten polycarbonate, in reactions ranging in size from small scale combinatorial formats to production-scale reactors.

Thus, in one aspect, the invention comprises an apparatus for the in situ monitoring of molten polymer and/or oligomer composition comprising: a light source; a fiber optic transmission probe, wherein the probe transmits at least one substantially monochromatic radiation from the light source to irradiate a sample comprising at least one polymer and/or oligomer and collects light transmitted from the irradiated sample; a spectrophotometer, wherein the spectrophotometer monitors radiation comprising UV/visible light absorbed by the irradiated sample; and a data analysis system, wherein the data analysis system correlates absorbance to at least one predetermined reaction component.

In another aspect, the present invention comprises a method for in situ monitoring of molten polymer and/or oligomer composition comprising the steps of: providing an optical contact between a fiber optic probe and a stream of a molten sample comprising at least one polymer and/or oligomer; irradiating the molten sample with at least one wavelength of substantially monochromatic radiation; monitoring UV/visible light adsorbed by the molten sample; and correlating the UV/visible light absorbed by the irradiated molten sample to levels of at least one reaction component of interest.

BRIEF DESCRIPTION OF DRAWINGS

Various features, aspects and advantages of the present invention will become more apparent with reference to the following description, appended claims, and accompanying drawings, wherein:

DETAILED DESCRIPTION

Figure 1:
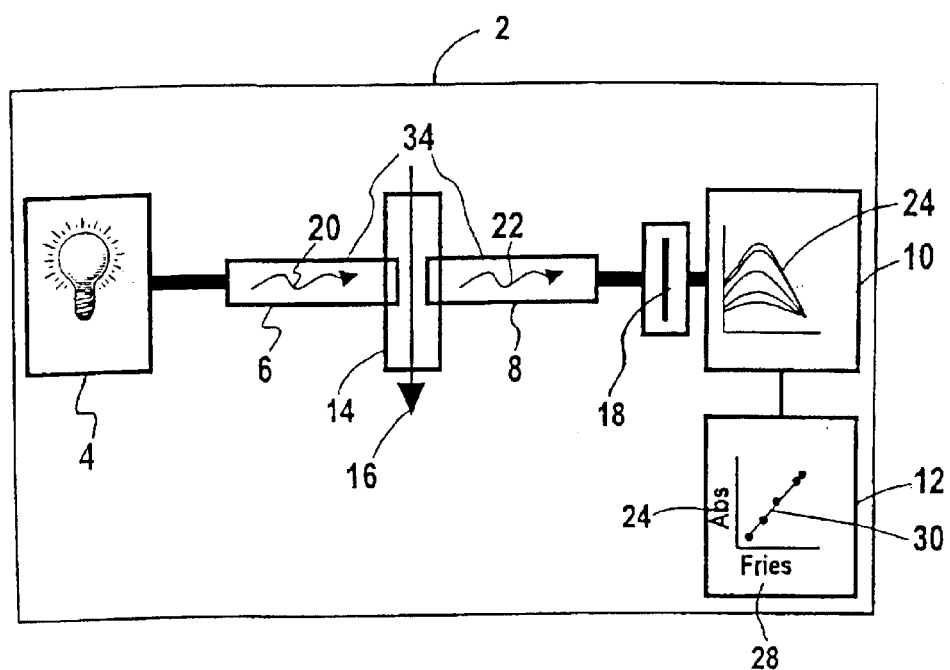
FIG. 1 illustrates an aspect of an embodiment of the method and apparatus of the invention.

Terms used herein are employed in their accepted sense or are defined. In this context, the present invention is directed to an apparatus and methods for real-time/on-line monitoring of a polymerization reaction in situ, without the removal of aliquots for sampling. The present invention relates to the monitoring of Fries products in melt polymerization reactions ranging in size from small scale combinatorial formats to production scale reactors.

Thus, in one aspect, the invention comprises an apparatus for the in situ monitoring of molten polymer and/or oligomer composition comprising: a light source; a fiber optic transmission probe, wherein the probe transmits at least one substantially monochromatic radiation from the light source to irradiate a sample comprising at least one polymer and/or oligomer and collects light transmitted from the irradiated sample; a spectrophotometer, wherein the spectrophotometer monitors radiation comprising UV/visible light absorbed by the irradiated sample; and a data analysis system, wherein the data analysis system correlates absorbance to at least one predetermined reaction component.

In an embodiment, the probe is maintained at a substantially constant temperature. The probe may comprise a high temperature probe. In an embodiment, the high temperature probe may be immersed in the polymer sample. Preferably, the probe operates at a temperature in the range from 200° C. More preferably, the probe operates at a temperature in the range from 250° C. to 350° C. Even more preferably, the probe operates at a temperature in the range from 260° C. to 330° C. In yet another embodiment, the apparatus includes a filter positioned between the light source and the spectrophotometer.

In an embodiment, the data analysis system comprises univariate analysis. Alternatively, the data analysis system may comprise multivariate analysis.

In an embodiment, the sample comprises molten polycarbonate. Preferably, the polycarbonate comprises melt polycarbonate. Even more preferably, the melt polycarbonate is produced by the polymerization of bisphenol A (BPA) and diphenyl carbonate (DPC).

In an embodiment, the predetermined reaction component is uncapped phenolic end-groups. In an embodiment, the reaction component comprises Fries products. Alternatively, the Fries rearrangement products may consist of linear Fries products or branched Fries products. For measurement of Fries products, the monitored absorbance preferably comprises at least one substantially monochromatic wavelength in the range of 250 to 450 nm. More preferably, the monitored absorbance comprises at least one substantially monochromatic wavelength in the range of 280 to 400 nm. More preferably, the monitored absorbance comprises at least one substantially monochromatic wavelength in the range of 290 to 330 nm. Even more preferably, the monitored absorbance comprises a wavelength of about 320 nm.

In an embodiment, the monitored radiation is correlated to predetermined reaction components comprising Fries products and uncapped phenolic end-groups. For measurement of Fries products and uncapped phenolic end-groups, the monitored absorbance preferably comprises at least two substantially monochromatic wavelengths in the range of 250 to 450 nm. More preferably, the monitored absorbance comprises at least two substantially monochromatic wavelengths in the range of 260 to 400 nm. Even more preferably, the monitored absorbance comprises at least two substantially monochromatic wavelengths in the range of 270 to 340 nm. In an embodiment, the apparatus further comprises computer readable media comprising software code.

In another aspect, the present invention comprises a method for in situ monitoring of molten polymer and/or oligomer composition comprising the steps of: providing an optical contact between a fiber optic probe and a stream of a molten sample comprising at least one polymer and/or oligomer; irradiating the molten sample with at least one wavelength of substantially monochromatic radiation; monitoring UV/visible light adsorbed by the molten sample; and correlating the UV/visible light absorbed by the irradiated molten sample to levels of at least one reaction component of interest.

Preferably, the probe is maintained at a substantially constant temperature. Preferably, the method includes using a high temperature probe for irradiating the polymer and collecting light transmitted from the polymer. In an embodiment, the high temperature probe is immersed directly in the polymer sample. Preferably, the probe operates at a temperature in the range from 200° C. to 400° C. More preferably, the probe operates at a temperature in the range from 250° C. to 350° C. Even more preferably, the probe operates at a temperature in the range from 260° C. to 330° C.

Preferably, the sample comprises melt polycarbonate. Even more preferably, the melt polycarbonate is produced by the polymerization of bisphenol A (BPA) and diphenyl carbonate (DPC).

In an embodiment, the step of correlating the UV/visible light absorbed by the irradiated molten sample to levels of a reaction component of interest comprises univariate analysis. Alternatively, the step of correlating the UV/visible light absorbed by the irradiated molten sample to levels of a reaction component of interest comprises multivariate analysis.

In an embodiment, the measured reaction component comprises uncapped phenolic end-groups. In an embodiment, the reaction component comprises Fries. Alternatively, the Fries rearrangement products may consist of linear Fries products or branched Fries products. For measurement of Fries products, the monitored absorbance preferably comprises at least one substantially monochromatic wavelength in the range of 250 to 450 nm. More preferably, the monitored absorbance comprises at least one substantially monochromatic wavelength in the range of 280 to 400 nm. More preferably, the monitored absorbance comprises at least one substantially monochromatic wavelength in the range of 290 to 330 nm. Even more preferably, the monitored absorbance comprises a wavelength of about 320 nm.

In an embodiment, the monitored radiation is correlated to predetermined reaction components comprising Fries products and uncapped phenolic end-groups. For measurement of Fries products and uncapped phenolic end-groups, the monitored absorbance preferably comprises at least two substantially monochromatic wavelengths in the range of 250 to 450 nm. More preferably, the monitored absorbance comprises at least two substantially monochromatic wavelengths in the range of 260 to 400 nm. Even more preferably, the monitored absorbance comprises at least two substantially monochromatic wavelengths in the range of 270 to 340 nm.

In an embodiment, the reaction component of interest is measured during production of the polymer. In an embodiment, irradiation and monitoring of light absorbed is performed on combinatorial libraries of samples. In an embodiment, the method includes the step of applying a predetermined selection test to determine whether any one of a set of preselected reaction components needs to be adjusted. Also included in the present invention is computer readable media comprising software code for performing the methods of the invention.

In another aspect, the invention comprises a method for real time monitoring of molten polycarbonate composition during production comprising: positioning an optical probe in optical contact with a stream of molten sample comprising at least one polymer and/or oligomer such that the probe maintains a substantially constant temperature; irradiating the molten sample with at least one wavelength of substantially monochromatic radiation; monitoring UV/visible light absorbed by the irradiated sample; and correlating the light absorbed by the irradiated sample to levels of Fries products.

In another aspect, the invention comprises a method for real time monitoring of molten polycarbonate composition during production comprising: positioning an optical probe in optical contact with a stream of molten sample comprising at least one polymer and/or oligomer, such that the probe comprises a substantially constant temperature; irradiating the molten sample with at least two wavelengths of substantially monochromatic radiation; monitoring UV/visible light absorbed by the irradiated sample; and correlating the light absorbed by the irradiated sample to levels of Fries products and phenolic end-groups.

In yet another aspect, the invention comprises a method for real time monitoring of molten polycarbonate composition during production comprising: positioning an optical probe in optical contact with a stream of molten sample comprising at least one polymer and/or oligomer, such that the probe comprises a substantially constant temperature; irradiating the molten sample with at least three wavelengths of substantially monochromatic radiation; monitoring UV/visible light absorbed by the irradiated sample; and correlating the light absorbed by the irradiated sample to levels of linear Fries products, branched Fries products, and phenolic end-groups. Thus, the invention describes the use of UV/visible absorbance spectroscopy to monitor the composition of molten samples comprising at least one polymer and/or oligomer. When radiation passes through a transparent layer of solid, liquid or gas, certain frequencies of radiation may be selectively removed by absorption. As defined herein, absorption of radiation occurs when electromagnetic energy is transferred to the atoms or molecules of the sample and these particles are promoted from a low energy (ground) state to higher energy, or excited states. Because atoms and molecules have a limited number of discrete, quantified energy levels, for absorption of radiation to occur, the energy of the exciting photon must match the energy difference between the ground state and one of the excited states of the absorbing species.

As defined herein, polycarbonate comprises long-chain linear polyesters of carbonic acid and dihydric phenols, such as bisphenol A (BPA). Generally, polycarbonate is produced either by interfacial polymerization or transesterification. In interfacial polymerization, BPA is phosgenated in an aqueous solution of sodium bisphenolate with methylene chloride as an organic solvent. In the melt process, polycarbonate is formed by a transesterification process in which BPA reacts with diphenyl carbonate (DPC) in a molten state without the use of methylene chloride solvent (see e.g. J. A. King, *Synthesis of Polycarbonates*, In Handbook of Polycarbonate Science and Technology, eds. D. G. LeGrand and J. T. Bender; Marcel Dekker, Inc., N.Y.). Generally, polymers are defined as compounds of greater than 7500 number average molecular weight (Mn) and oligomers are compounds comprising more than one unit, but less than 7500 Mn. Molten polycarbonate is polycarbonate which is melted, and thus is maintained at an elevated temperature, generally ranging from 200° C. to 350° C., and comprises a fluid mixture which is homogeneous in consistency.

Fries rearrangement products are formed by the conversion of phenolic esters into corresponding ortho and para hydroxyketones as a result of the inherent stability of polybenzenoid compounds. Fries products in melt polycarbonate generally include compounds having the following repeating unit:

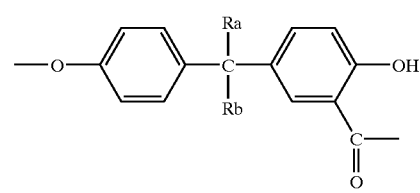

wherein variables $R_a$ and $R_b$ each independently represent a hydrogen atom or a monovalent hydrocarbon group and may form a ring structure. In some instances, it is advantageous to know the amount of linear or branched Fries products, rather than just total Fries. Linear Fries products in melt polycarbonate generally include compounds having the following structure:

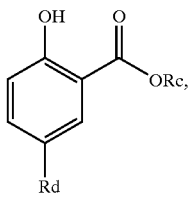

and branched Fries products in melt polycarbonate generally include compounds having the following structure:

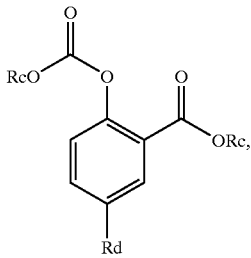

where $R_c$=bisphenol A, and $R_d$=isopropylidine(-4-phenol) in oligomeric and polymeric polycarbonate, and $R_c$=phenyl, and $R_d$=a hydrogen atom in standard (model) materials.

In an embodiment, the invention comprises methods to measure uncapped phenolic end-groups in polycarbonate. As defined herein, uncapped polymer chains are those chains which terminate in a free phenolic group, as opposed to being terminated with an aryl carbonyl group.

Thus, the invention describes using absorbance spectroscopy for on-line monitoring of Fries products produced during melt production of polycarbonate. In one aspect, and referring to FIG. 1, the invention comprises an apparatus 2 for in situ monitoring of polymer formation. In an embodiment, the apparatus of the invention comprises a UV/visible light source 4, a fiber optic transmission probe 34 comprising two arms 6 and 8, a spectrophotometer 10, a data analysis system 12, and a compartment 14 in which molten polymer/oligomer sample 16 flows through. In an embodiment, sample 16 is melt polycarbonate formed by polymerization of diphenyl carbonate (DPC) and bisphenol A (BPA).

In an embodiment, light source 4 comprises a steady-state Xe arc lamp, or the like. Thus, in an embodiment, substantially monochromatic radiation 20 from lamp 4 is directed via probe 34 arm 6 to irradiate sample 16 flowing through vessel 14. Substantially monochromatic light generally comprises radiation having a very narrow band of wavelengths, comprising a variation of about 1 nm or less. Transmitted light 22 is then collected by the second arm 8 of probe 34 and directed to spectrophotometer 10 to generate an absorbance profile 24 which is then processed by data analysis system 12. As defined herein, a data analysis system comprises hardware and software components to perform spectral analysis to extract information of interest. The hardware components include components to transfer the generated optical signals to a device with software for applying chemometrics and other mathematical analysis techniques to relate the measured absorbance to a reaction parameter of interest. As defined herein, chemometrics is the science of relating measurements made on a chemical system or process to the state of the system via application of mathematical or statistical methods. In an embodiment, the data analysis system monitors absorbance correlated to at least one predetermined reaction component and uses statistical and chemometrics techniques to correlate the absorbance values to that sample component.

Thus, the apparatus of the present invention comprises a data acquisition system and a data analysis system for the in situ monitoring of molten polymer and/or oligomer composition. The data acquisition system comprises hardware and software components to collect and process optical spectra. The hardware components include the light source, optical filters, optical fibers, optical probe(s), spectrophotometer, detector and any other components needed to generate light emission, transmit the light to the measurement location, and transmit emitted radiation from the measurement location to the detector system for storage of the optical signals.

The emission level from light source 4 may be attenuated such that spectrometer 10 is not saturated. Preferably, an in-line short-pass filter 18 is positioned to block spectrophotometer 10 from excess radiation. More preferably, filter 18 blocks radiation having a wavelength above 450 nm.

Figure 2:
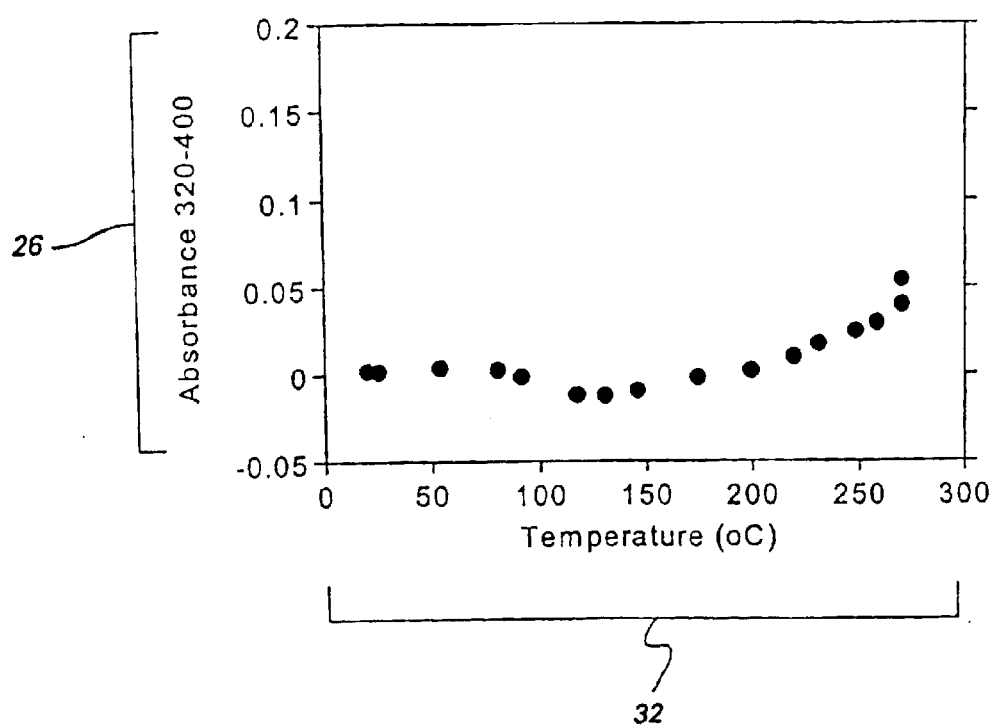
FIG. 2 illustrates an aspect of an embodiment of the invention comprising performance of a fiber optic UV flow-cell at different temperatures.

In an embodiment, the probe is maintained at a substantially constant temperature, wherein a substantially constant temperature comprises less than 1° C. variation during the course of the measurement. Generally, both the probe and the vessel containing the polymer are stable to the harsh conditions which may occur in the plant environment. For example, the invention may comprise a flow-cell for measuring molten polycarbonate. Referring now to FIG. 2, flow-cell 14 preferably shows only a small variation in baseline absorbance at the high temperatures required to measure molten polycarbonate. More preferably, a majority of the variation for flow-cell 14 is corrected for using chemometric statistical techniques, such as baseline correction and the like.

In an embodiment, probe 34 is a standard fiber-optic probe. The use of a standard probe is possible by positioning the probe at some distance from the heated reactor surface. Generally, standard probes are positioned about 3 mm, but not more than 200 mm, from the flow-cell 14 surface. As will be understood by those of ordinary skill in the art, in the plant environment, it may be necessary to secure the probe in some type of retaining device that is heated to the same temperature as the reaction mixture flow, such as a flange or the like.

In an embodiment, probe 34 is a high temperature fiber-optic probe such as probes supplied by Equitech International Corporation (Aiken, S.C.), and Ocean Optics (Dunedin, Fla.) Guided Wave® type probes, and the like. High temperature probes may be positioned closer to the reactor to deliver increased amounts of light to the sample, thereby increasing the quality of spectra collected. Alternatively, probe 34 may be a dip-stick which is actually immersed in the sample, such as probes provided by HELLMA Gmbh & Co. KG., (Mullheim, Germany), Ocean Optics (Dunedin, Fla.) Guided Wave® type probes, and the like.

The apparatus may be used for in situ monitoring of polymer samples which are constituents of a larger structure. Thus, irradiation and collection of spectra of the polymer may be performed using a viewing port or a side tube on a reactor. For example, polycarbonate from a reactor may be siphoned into a side arm or flow-cell for UV absorbance measurements and then returned back to the reactor. Alternatively, the apparatus may be used for monitoring polymer samples which are combinatorial libraries of samples dispersed in a 96-well microtiter plate reactor or other type of array.

In another aspect, and referring back to FIG. 1, the invention comprises a method for in-situ monitoring of polymer formation comprising the steps of providing an optical contact between fiber optic probe 34 and a stream of a molten sample 16 comprising at least one polymer and/or oligomer, irradiating molten sample 16 with at least one wavelength of substantially monochromatic radiation 20 and measuring light transmitted 22 by said irradiated molten material, monitoring light absorbed by the irradiated polymer 24, and correlating 30 absorbance values 24 to levels of a reaction product of interest such as Fries product 28 in sample 16. Preferably, the method includes applying a predetermined selection test to determine whether any one of a set of preselected reaction components needs to be adjusted.

In an embodiment, the method is used to monitor the amount of Fries in samples of polycarbonate. For example, and referring now to FIG. 3, the levels of Fries products in molten melt polycarbonate may be monitored by measuring absorbance spectra. It can be seen that over the wavelength range comprising 300 to 400 nm, absorbance spectra are able to distinguish molten melt polycarbonate samples comprising 0, 25, 150, and 280 ppm total (branched and linear) Fries, respectively.

For samples having significant differences in Fries levels, raw spectra can be used to distinguish Fries levels in different samples. In some cases, and still referring to FIG. 3, statistical correction may be used to reduce variation which is independent of the levels of Fries products, but may result due to variations in instrument performance under the harsh conditions required to measure Fries products in molten polycarbonate. For example, baseline variation may be corrected for chemometrics software such as MATLAB® which provide for tilt and offset correction, and the like.

In an embodiment, Fries product is measured during production of the polymer. In an embodiment, and referring again to FIG. 3, measurement of Fries is performed on a flow of molten polycarbonate. Alternatively, and referring now to FIG. 4, samples may be measured under static (stopped-flow) conditions wherein the flow of molten sample is stopped for a short period of time (e.g. 0.1 to 10 sec) sufficient for an absorbance reading. In some situations, the use of stopped flow enhances signal resolution. For example, gas bubbles or any other inhomogeneities present in the flowing stream of molten material will induce errors in spectral measurements. These errors can be reduced by performing the spectral measurements under stopped-flow conditions, whereby inhomogeneities in the molten material do not interfere with the optical beam.

When the method is used for monitoring a large-scale reactor, irradiation and collection of spectra may be performed using a viewing port or side arm on a reactor. For these types of measurements, a high temperature probe, which can be positioned immediately adjacent to the reactor surface, may be used. Alternatively, irradiation and collection of spectra may be performed on combinatorial libraries of samples dispersed in a 96-well microtiter plate reactor or other type of array. For these types of measurements, a dip-stick type probe, which can be directly immersed in the melt, may be used.

In an embodiment, the monitored light comprises at least one wavelength in the range of 250 to 450 nm. Different regions of the spectra may be used for different applications. For example, and referring back to FIG. 3, a comparison of Fries absorption features over the range from 350 to 450 nm, indicates that there is less sensitivity in the long wavelength range. Thus, the long wavelength range may be problematic for samples having low amounts of Fries, such as early stage polycarbonate. In some situations, however, it may be advantageous to use the long-wavelength region of the Fries absorption band due to the smaller attenuation coefficient of optical fibers at longer wavelengths and the ability to use visible light sources in this region of the spectrum.

Absorbance measurements may be taken at a unique wavelength, or at multiple wavelengths. Thus, the absorbance spectrum may be monitored at one wavelength for univariate analysis, or at more than one wavelength for multivariate analysis. Generally, the absorbance characteristics of the sample are analyzed using statistical techniques. Thus, the absorbance characteristics of the sample may be analyzed using univariate linear regression calibration methods (see e.g. H. Mark and J. Workman, *Statistics in Spectroscopy:* Academic Press: San Diego, Calif., pp. 263–276 (1991); and J. which provide quantitative prediction of Fries products in a sample based on absorbance measurements at one wavelength. Alternatively, univariate calibration models may be derived which provide quantitative prediction of linear Fries products, or branched Fries products, or uncapped end-groups, in a sample based on absorbance measurements at one wavelength.

Where the absorbance spectrum comprises several wavelengths or an entire absorption band, the absorbance characteristics of the sample may be determined using multivariate calibration algorithms such as Partial Least Squares Regression (PLS), Principal Components Regression (PCR), and the like (see e.g. Beebe, K. R., et al., *Chemometrics: A Practical Guide,* Wiley, New York, N.Y., pp. 183–339 (1998)). Given a large enough span of calibration samples, multivariate calibration models are generally more robust than univariate models due to enhanced outlier detection capabilities and increased tolerance toward slight shifting in peak position or band shape. Also, multivariate calibration models allow for measurement of more than one variable or component of interest. PLS models may be used to correlate the sources of variation in the spectral data with sources of variation in the sample. Preferably, the PLS model is validated by statistical techniques. Such statistical techniques include, but are not limited to, leave one out cross-validation, venetian blinds, and random subsets (see e.g. Beebe, K. R., et al., *Chemometrics: A Practical Guide,* Wiley, New York, N.Y. (1998)).

Figure 5:
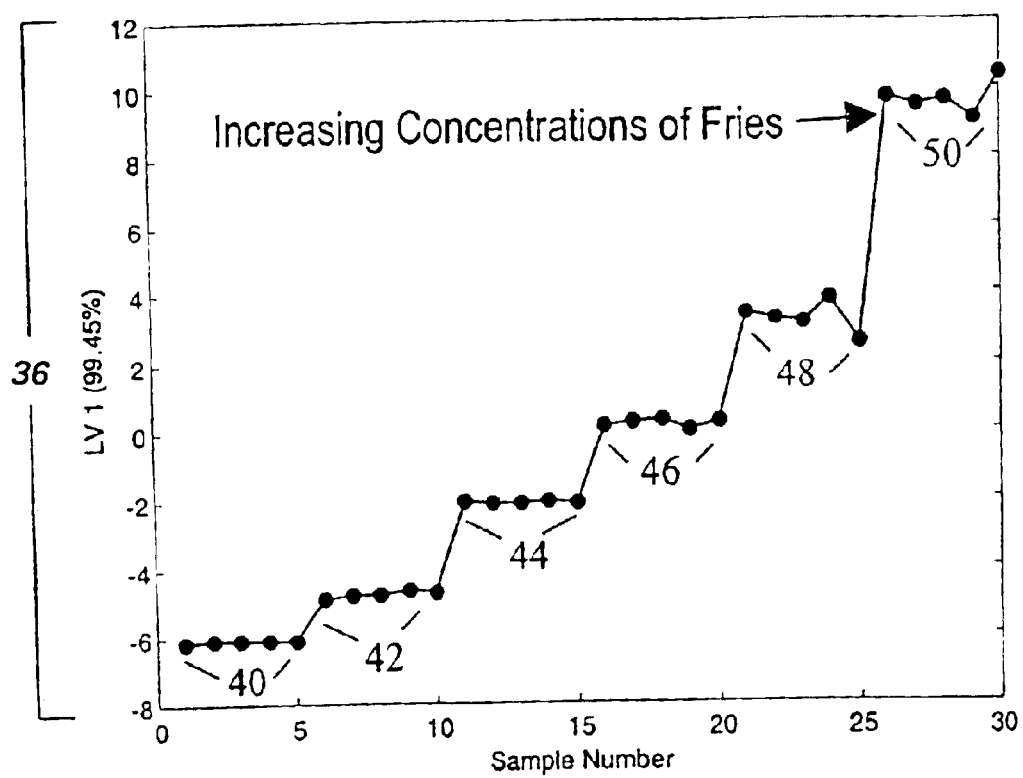
FIG. 5 illustrates an aspect of an embodiment of the invention comprising the first latent variable (LV1) of a partial least squares (PLS) model representing Fries concentration plotted as a function of measured spectra number.
Figure 6:
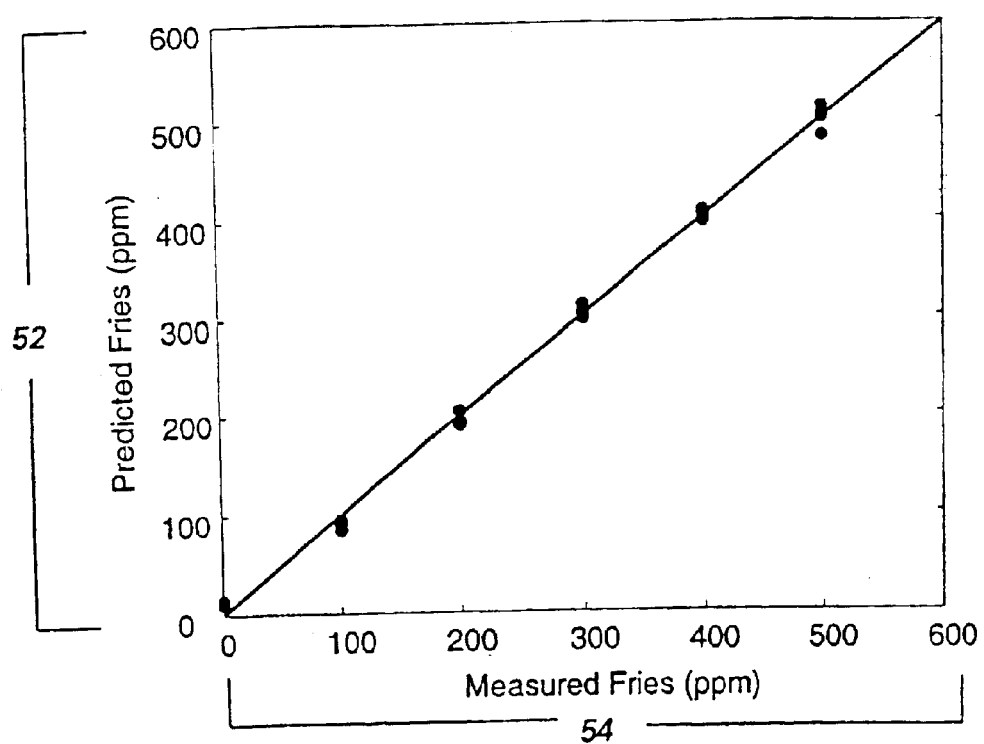
FIG. 6 illustrates an aspect of an embodiment of the invention comprising applying a partial least squares (PLS) model to Fries absorption spectra to generate a correlation plot of measured vs. predicted Fries concentrations.

Thus, in an embodiment, a sample is irradiated with UV/visible light, and an absorbance spectrum comprising a distinct range of wavelengths is monitored. By multivariate analysis, the presence and/or amount of multiple sample components such as linear Fries, branched Fries, and phenolic end-groups is determined for each sample. Preferably, for both univariate and multivariate analysis, a sufficient number of known samples is used to generate the model such that the 95% confidence interval and the 95% prediction interval are suitable for routine screening of polymer production. FIGS. 5 and 6 show the application of partial least squares regression (PLS) to correlate the absorbance spectra to Fries levels. Referring to FIG. 5, in an embodiment, variation in the first latent variable tracks the changes in Fries for sample groups 40, 42, 44, 46, 48, and 50 having increasing concentrations of Fries, respectively. Referring now to FIG. 6, in an embodiment, multivariate PLS modeling provides a means to predict sample Fries 52 based on a model derived from samples comprising known amounts Fries 54. As will be understood by those in the art, this type of analysis may be applied to other reaction components of interest, or to the simultaneous analysis of multiple reaction components.

As an alternative to PLS modeling, chemometric analysis techniques such as principal component analysis (PCA) and related tools can be used to assess potential outliers in the analysis of one, or multiple, reaction components. PCA is used to identify a lower-dimensional coordinate system that captures the variance in a data set. The first principal component is the axis along the direction of the primary source of variation; the second principal component is the axis along the second most major source of variation; the third principal component is the axis along the third most major source of variation, and so forth. Because polycarbonate absorbance spectra are fairly simple, the majority of spectral variation is generally described using the first two or three principal components.

Principal component scores for a spectrum may be computed by projecting the spectrum into a coordinate system which is defined by the major principal components calculated for a database of spectra. In an embodiment, plotting the spectral descriptors as a function of their principal component scores generates a two-dimensional spectral descriptor plot. The spectral descriptor plot provides for the direct comparison of all the spectra in the database. Because the position of each spectral descriptor in the plot is defined by the major components of variation in the spectra, spectra of similar shape will preferably generate spectral descriptors which fall near each other in the spectral plot. Conversely, spectra of dissimilar shape will preferably generate spectral descriptors which fall far from each other in the spectral plot. For example, and referring now to FIG. 7, samples with high amounts Fries products have spectral descriptors 60 which are distinguished from spectral descriptors from samples having lower amounts of Fries products 62 and 64, respectively, and spectral descriptors from samples with no Fries products 66.

As will be recognized by those of ordinary skill in the art, all or part of the steps in the method of the present invention may be coded or otherwise written in computer software, in a variety of computer languages including, but not limited to, C, C++, Pascal, Fortran, Visual Basic®, Microsoft Excel, MATLAB®, Mathematica®, Java, and the like. Accordingly, additional aspects of the present invention include computer software for performing one or more of the method steps set forth herein. The software code may be compiled and stored in executable form on computer readable media as, for example, computer ROM, floppy disk, optical disk, hard disks, cd ROM, or the like.

Thus, the invention comprises methods and devices for the noninvasive monitoring of polymer formation using UV/visible absorbance spectroscopy. The method further contemplates the use of univariate and multivariate analysis for determining changes in levels of reaction components of interest as polymerization proceeds. The invention permits determination of Fries products formed during the melt polymerization process, and using that information to adjust reaction parameters, thereby optimizing polymer production.

For example, an embodiment of an apparatus for monitoring the synthesis of melt polycarbonate comprises a UV/visible light source; a high-temperature probe which may be placed directly adjacent to, or immersed in, a production scale reactor; a spectrophotometer for generating absorbance spectra; and a computerized data analysis system for generating multivariate estimation of sample Fries. The calculated Fries levels are used by the operator to adjust the reaction, thereby optimizing polycarbonate synthesis in a plant environment. The invention may be further understood by reference to the following non-limiting examples.

EXAMPLE 1

Univariate Quantitation of Fries in Molten Melt Polycarbonate

To analyze Fries in molten melt polycarbonate, melt polycarbonate samples with known levels of Fries products were melted and injected into a flow-cell. Actual levels of Fries products (in ppm) were measured by liquid chromatography as previously described in U.S. Pat. No. 6,184,334 after methanolysis in potassium hydroxide. Briefly, 0.5 g polycarbonate was dissolved in 4.0 ml of tetrahydrofuran (THF) containing para-terphenyl as an internal standard. Potassium hydroxide (3.0 mL of 18% KOH in methanol) was then added and the resulting mixture stirred for 2 hours at 25° C. and then 1.0 mL acetic acid added and the mixture was stirred for 5 min. After removal of the resultant potassium acetate crystals, the filtrate was analyzed by liquid chromatography. Polymer molecular weight (number average molecular weight: Mn) was measured by gel permeation chromatography (GPC) at 25° C. using chloroform as the mobile phase (U.S. Pat. No. 6,184,334). Standards of polystyrene were used to construct a universal calibration against which polycarbonate could be measured using the Mark-Houwink equation. Terminal structure and the concentration of terminal —OH groups (phenolic end-groups) was obtained as described in U.S. Pat. No. 5,151,491 using $^{13}$C NMR and IR spectroscopy.

Measurements by the method of the present invention were performed under constant liquid flow or under stopped-flow conditions. In these experiments, a fiber-optic spectrometer (Ocean Optics ST2000; Dunedin, Fla.) was used in combination with a steady-state Xe arc lamp (450-W Xe arc lamp; Model FP-024; SLM Instruments, Inc., Urbana, Ill.) or a deuterium lamp (Ocean Optics). The lamp emission level was attenuated in order to avoid saturation of the spectrometer. An in-line, short-pass (400 nm cut-off) filter was positioned between the sample and the spectrometer to block intense radiation above 400 nm.

For measurements of Fries from 0–1,000 ppm, an optical pathlength of 2 mm was used. FIG. 2 shows the variation of baseline absorbance as a function of operating temperature for an empty flow-cell. It can be seen that the variation increases with temperature up to a maximum of about 0.05 absorbance units (AU) at 270° C. These levels of variation do not significantly affect measurement of Fries even at low Fries concentrations (e.g. <100 ppm) and can be compensated for by standard chemometrics baseline correction data analysis techniques, e.g., as described in Beebe, K., et al., *Chemometrics: A Practical Guide,* Wiley, New York, N.Y. (1998). These include explicit modeling, derivatives, multiplicative scatter correction, and the like. For example, in this experiment, baseline correction was done using commercially available chemometrics software MATLAB® (The Mathworks Inc., Natick, Mass.).

FIG. 3A shows a collection of raw (uncorrected) spectra for molten melt resin having Fries concentrations ranging from 0 to 280 ppm and their respective baselines. Baseline correction was performed using commercially available chemometrics software (MATLAB®) which provides both tilt and offset correction. Baseline corrected spectra are shown in FIG. 3B. It can be seen that baseline correction removes variability, particularly for spectral regions of longer wavelength.

Figure 4:
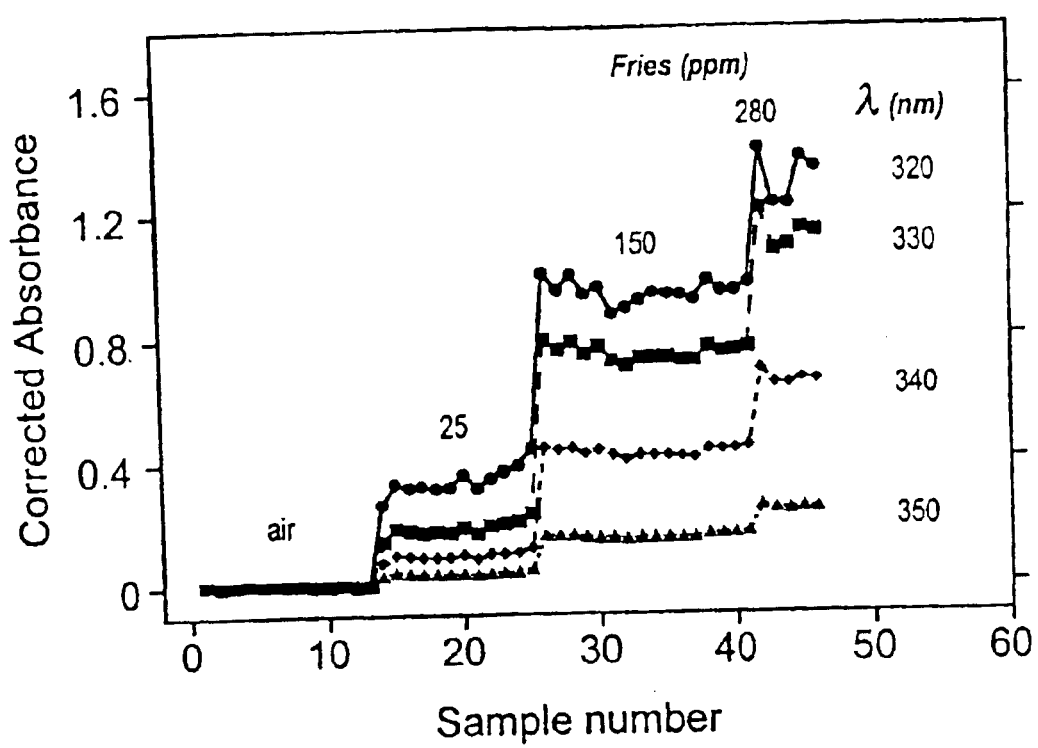
FIG. 4 illustrates an aspect of an embodiment of the invention comprising performance of the measurement system under stopped-flow conditions.

FIG. 4 illustrates the performance of the measurement system under stopped-flow conditions. In these experiments, approximately 100 g of molten melt polycarbonate having Fries concentrations of 0 (air), 25, 150, or 280 ppm was pumped through a glass vessel (0.5 L) connected to a fiber optic flow-through cell. The entire system was maintained in air at atmospheric pressure, and held at a substantially constant temperature (i.e. with a variance of less than 1° C.). Samples were irradiated with a broadband light source and spectra were collected with the spectrometer as described above. Absorbance of light at 320, 330, 340 or 350 nm is indicated (FIG. 4).

Figure 3:
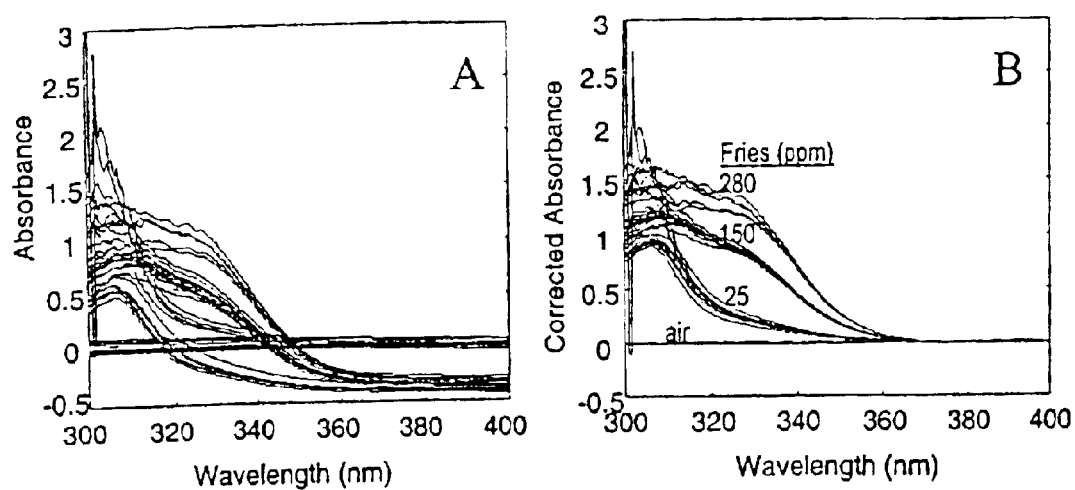
FIG. 3 illustrates an aspect of an embodiment of the invention comprising absorption spectra of molten melt polycarbonate resin wherein (A) shows untransformed (raw) absorption spectra and (B) shows the same spectra after baseline correction.

As can be seen in FIGS. 3 and 4, measurements of the long wavelength shoulder of the Fries absorption band resulted in improved precision, but reduced sensitivity. A comparison of precision for absorption determinations for 280 ppm of Fries at different wavelengths is presented in Table 1.

TABLE 1

Precision of Fries Determination in Molten Melt Polycarbonate as a Function of Detection Wavelength

| λ (nm) | % Relative Standard Deviation |
|---|---|
| 320 | 3.6 |
| 330 | 3.1 |
| 340 | 3.0 |
| 350 | 1.9 |

EXAMPLE 2

Multivariate Quantitation of Fries Product in Molten Melt Polycarbonate Material A partial least squares (PLS) regression model was developed to explain the variation in collected spectra as a function of Fries concentration. Actual levels of Fries products were measured by liquid chromatography as described for Example 1. PLS models were validated using standard methods of leave-one-out cross-validation (CV) (Beebe, K. R., et al., *Chemometrics: A Practical Guide;* Wiley: New York, N.Y., 1998) after appropriate preprocessing. In this example, preprocessing consisted of selecting the spectral range for multivariate analysis, base-line correction, and mean-centering of the data.

FIG. 5 illustrates the plot of the first latent variable of the developed PLS model for a sequence of measured spectra. In this experiment, sample groups 1–5, 6–10, 11–15, 16–20, 21–25, and 25–30 each contained the same amount of Fries. It can be seen that that the variation in the first latent variable of the developed PLS model tracks the changes in Fries concentration from 0 to 500 ppm.

Results of applying the PLS model to the Fries absorption spectra are presented in FIG. 6, as a correlation plot of measured vs. predicted Fries concentration. The root mean squared error of cross-validation (RMSECV) can be used to estimate the predictive performance of PLS models developed with a small number of calibration standards, wherein RMSECV is defined to be the standard deviation of the predicted Fries concentration minus the laboratory estimated Fries concentration (i.e. standard deviation of test set residuals). For these experiments a three-factor PLS regression model accounts for greater than 99% of the spectral variance and greater than 99% of the Fries concentration with an RMSECV of 10 ppm Fries, and a Root Mean Squared Error of Calibration (RMSEC) of 9 ppm Fries.

EXAMPLE 3

Fault Detection in Fries Monitoring in Molten Melt Polycarbonate

Chemometric analysis may also be used to optimize normal operating conditions and predict outliers in the measured data. Principal component analysis (PCA) was used to generate a spectral descriptors plot using the spectra shown in FIG. 3B. For PCA, spectral data was arranged as a Fries concentration-absorbance intensity response matrix. Analysis of the data was performed using software from the PLS_Toolbox (Eigenvector Research, Inc., Manson, Wash.) operated with MATLAB® software (Mathworks Inc., Natick, Mass.). For the experiment shown, the data was preprocessed by mean-centering and the first and second principal components plotted.

Figure 7:
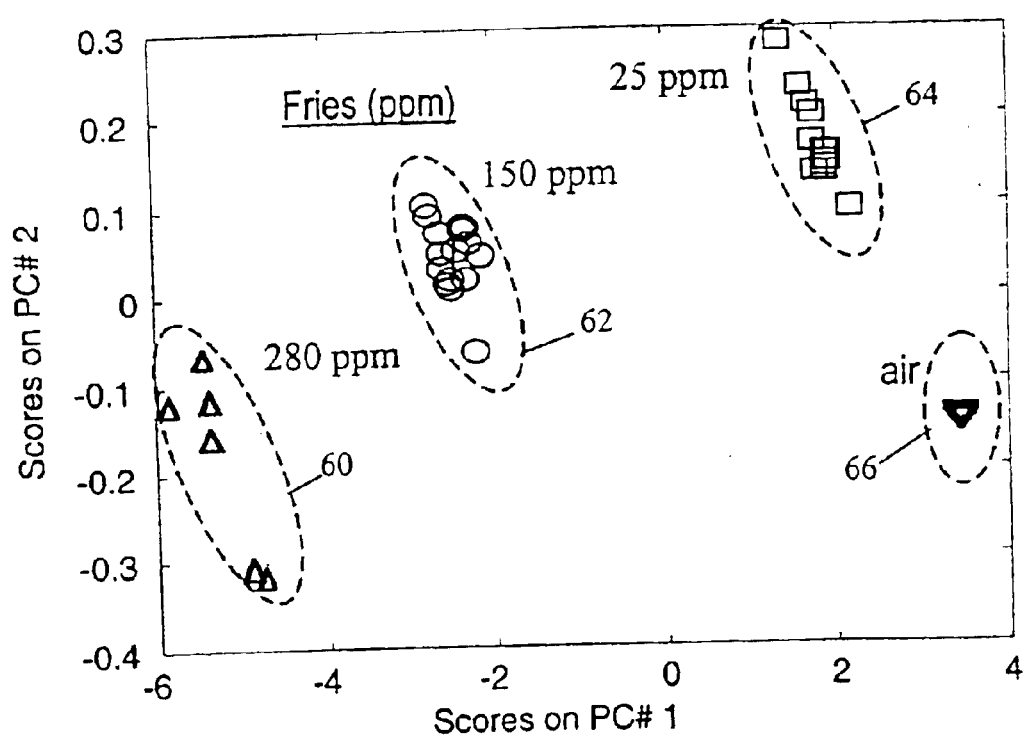
FIG. 7 illustrates an aspect of an embodiment of the invention comprising a principal components analysis (PCA) plot for spectra collected for calibrations for molten melt polycarbonate.

FIG. 7 shows a PCA plot for the 46 spectra shown in FIG. 3B. For visualization on spectral plots, Fries values were combined to fall in distinct ranges. Thus, results for Fries products were grouped as follows: (▽) 0 ppm (air), (<) 25 ppm, (O) 150 ppm and (Δ) 280 ppm.

To ensure a normal monitoring operation, the quality of collected spectra $X_i$ may be evaluated using statistical tools such as multivariate control charts and multivariate contribution plots, among others. This allows for the detection of faults and the diagnosis of problems in the collected spectra. Multivariate control charts can use statistical indicators of the PCA model, such as Q and $T^2$ values plotted as a function of collected spectrum number. The Q residual is defined as the squared prediction error and describes how well a multivariate model fits the data. $T^2$ gives a measure of variation within the multivariate model, and is used to describe statistically anomalous samples. The significant principal components of the PCA model are used to develop the $T^2$-chart and the remaining principal components contribute to the Q-chart.

As the squared prediction error, the Q residual is a measure of the amount of variation in each sample not captured by K principal components retained in the model such that:

$$Q_i = e_i e_i^T = x_i(I - P_k P_k^T) X_i^T. \quad (1)$$

where $e_i$ is the ith row of E, $x_i$ is the ith sample in X, $P_k$ is the matrix of the k loading vectors retained in the PCA model (where each vector is a column of $P_k$) and I is the identity matrix of appropriate size (n×n). The Q residual chart thus monitors the deviation from the PCA model for each sample.

The sum of normalized squared scores, known as Hotelling's $T^2$ statistic, is a measure of the variation within the PCA model and allows for the identification of statistically anomalous samples. $T^2$ is defined as:

$$T_i^2 = t_i \lambda^{-1} t_i^T = x_i P \lambda^{-1} P^T x_i^T, \quad (2)$$

where $t_i$ is the ith row of $T_k$, the matrix of k scores vectors from the PCA model, and $\lambda^{-1}$ is the diagonal matrix containing the inverse of the eigenvalues associated with the k eigenvectors (PCs) retained in the model. The $T^2$-chart monitors the multivariate distance of a new sample from a target value in the reduced PCA space.

Figure 8:
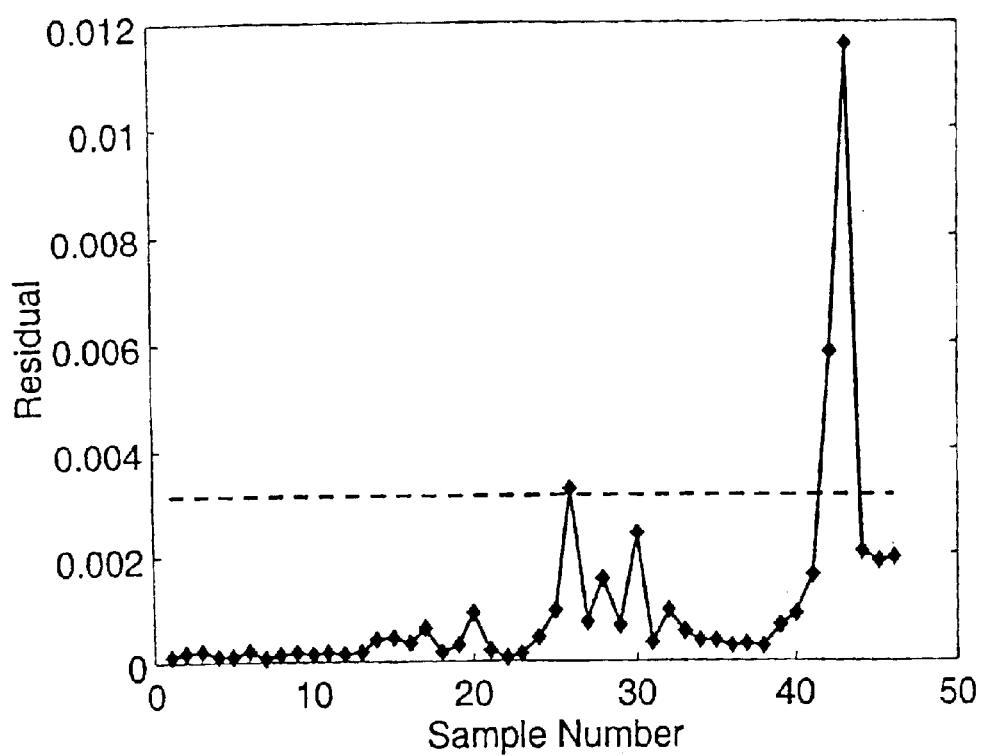
FIG. 8 illustrates an aspect of an embodiment of the invention comprising Q residuals for principal components analysis (PCA) of Fries absorption spectra.
Figure 9:
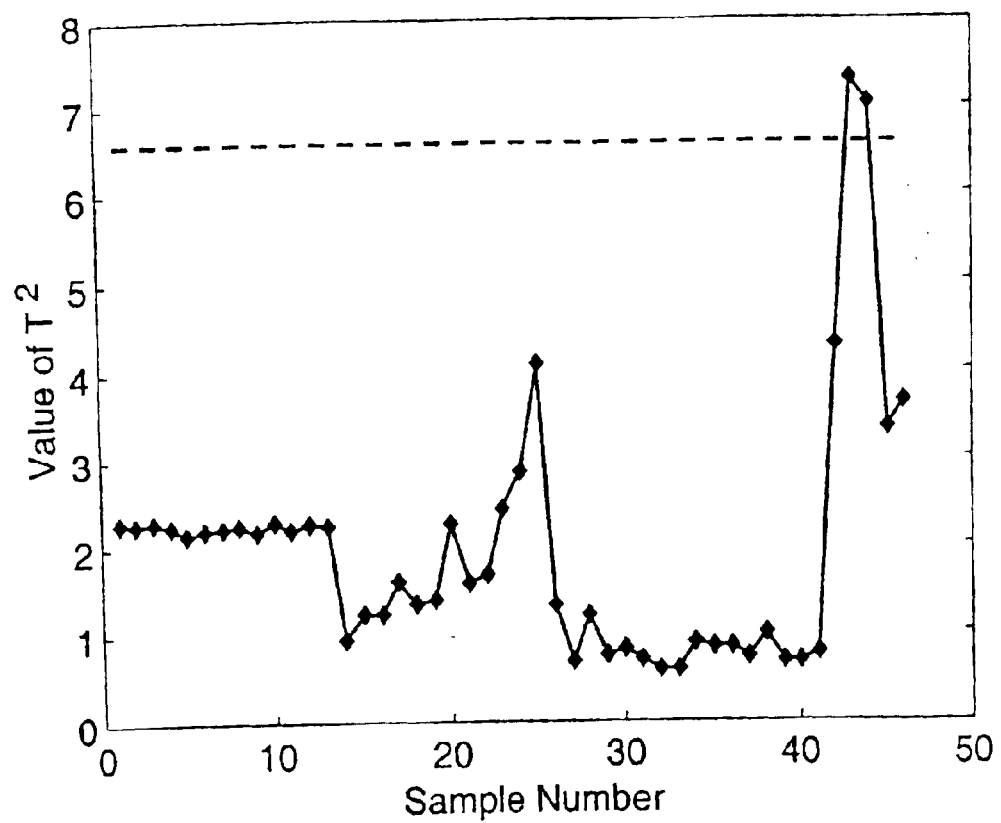
FIG. 9 illustrates an aspect of an embodiment of the invention comprising $T^2$ values for principal components analysis (PCA) of Fries absorption spectra.

Referring to FIGS. 8 and 9, the Q and $T^2$ control charts may be statistical indicators in monitoring of spectra. These charts illustrate samples that exceed some predetermined confidence limit, for example, the 95% confidence limit, for the PCA model. FIG. 8 shows a plot of the process residual Q for Fries in molten polycarbonate with a 95% limit based on applying the two principal components model to the 46 spectra. It can be seen that except for a few isolated samples (26, 42, and 43) the Q residuals are below 0.003, which corresponds to the 95% confidence level. FIG. 9 shows the value of $T^2$ with a 95% limit based on a two principal component model. Only samples 43 and 44 appeared statistically anomalous. The contribution plots of Q residuals and Hotelling's $T^2$ statistic thus may be used to provide an indication of which collected spectra $X_i$ cause problems in a given sample. A large Q residual may occur, for example, due to data collection errors or process disturbances.

It will be recognized by those in the art that advantages of the spectroscopic method disclosed here over other methods for the on-line monitoring of polymerization reactions include:

1. Short analysis time providing for rapid assessment of levels of reaction components of interest.
2. Operation on large-scale reactors such as that used in manufacturing systems.
3. On-line measurement of production stage reactions.
4. Minimal or no sample preparation.
5. Non-destructive and non-contact analysis in that measurements are performed with polymer or molten polymer without destruction of sample or disruption of polymerization process.
6. Operation on small sample size such as that used in combinatorial libraries.
7. Multivariate analysis that allows for detection of small changes in sample components where spectra may be complicated by noise due to environmental and instrument variability.

It will be understood that each of the elements described above, or two or more together, may also find utility in applications differing from the types described herein. While the invention has been illustrated and described as embodied in a method for large-scale chemical screening, it is not intended to be limited to the details shown, since various modifications and substitutions can be made without departing in any way from the spirit of the present invention. For example, robotic equipment can be used to prepare the samples or modify reaction conditions. Also, various types of parallel analytical screening methods can be incorporated. Also, products derived during polymerization reactions other than Fries and uncapped end-products can be assessed using the techniques described herein. As such, further modifications and equivalents of the invention herein disclosed may occur to persons skilled in the art using no more than routine experimentation, and all such modifications and equivalents are believed to be within the spirit and scope of the invention as defined by the following claims. All patents and publications cited herein are fully incorporated by reference in their entirety.

What is claimed is:

1. An apparatus for in situ monitoring of molten polycarbonate polymer and/or oligomer composition comprising:
    a light source;
    a fiber optic transmission probe, wherein said probe transmits at least one substantially monochromatic radiation from said light source to irradiate a molten sample comprising at least one polycarbonate polymer and/or oligomer and collects light transmitted from said irradiated sample;
    a spectrophotometer, wherein said spectrophotometer monitors radiation comprising UV/visible light absorbed by said irradiated sample; and
    a data analysis system, wherein said data analysis system correlates absorbance to at least one predetermined reaction component in said molten polycarbonate polymer and/or oligomer sample to provide real-time monitoring of the composition of said polycarbonate during production.

2. The apparatus of claim 1, wherein said probe is maintained at a substantially constant temperature.

3. The apparatus of claim 1, wherein said probe comprises a high temperature probe.

4. The apparatus of claim 3, wherein said probe is immersed in the polymer sample.

5. The apparatus of claim 3, wherein said probe operates at a temperature in the range from 200° C. to 400° C.

6. The apparatus of claim 3, wherein said probe operates at a temperature in the range from 250° C. to 350° C.

7. The apparatus of claim 3, wherein said probe operates at a temperature in the range from 260° C. to 330° C.

8. The apparatus of claim 1, further comprising a filter positioned between said light source and said spectrophotometer.

9. The apparatus of claim 1, wherein said data analysis system comprises univariate analysis.

10. The apparatus of claim 1, wherein said data analysis system comprises multivariate analysis.

11. The apparatus of claim 1, wherein said polycarbonate comprises melt polycarbonate.

12. The apparatus of claim 11, wherein said melt polycarbonate is produced by polymerization of bisphenol A (BPA) and diphenyl carbonate (DPC).

13. The apparatus of claim 1, wherein said reaction component comprises uncapped phenolic end-groups.

14. The apparatus of claim 1, wherein said reaction component comprises Fries products.

15. The apparatus of claim 14, wherein said Fries products consist of linear Fries products.

16. The apparatus of claim 14, wherein said Fries products consist of branched Fries products.

17. The apparatus of claim 14, wherein said monitored absorbance comprises at least one substantially monochromatic wavelength in the range of 250 to 450 nm.

18. The apparatus of claim 14, wherein said monitored absorbance comprises at least one substantially monochromatic wavelength in the range of 280 to 400 nm.

19. The apparatus of claim 14, wherein said monitored absorbance comprises at least one substantially monochromatic wavelength in the range of 290 to 330 nm.

20. The apparatus of claim 14, wherein said monitored absorbance comprises a wavelength of about 320 nm.

21. The apparatus of claim 1, wherein said monitored absorbance is correlated to predetermined reaction components comprising Fries products and uncapped phenolic end-groups.

22. The apparatus of claim 21, wherein said monitored absorbance comprises at least two substantially monochromatic wavelengths in the range of 250 to 450 nm.

23. The apparatus of claim 21, wherein said monitored absorbance comprises at least two substantially monochromatic wavelengths in the range of 260 to 400 nm.

24. The apparatus of claim 21, wherein said monitored absorbance comprises at least two substantially monochromatic wavelengths in the range of 270 to 340 nm.

25. Computer readable media comprising software code for the apparatus of claim 1.

26. A method for in situ monitoring of molten polycarbonate polymer and/or oligomer composition comprising:
    providing an optical contact between a fiber optic probe and a stream of a molten sample comprising at least one polycarbonate polymer and/or oligomer;
    irradiating the molten sample with at least one wavelength of substantially monochromatic radiation;
    monitoring UV/visible light adsorbed by the molten sample; and
    correlating the UV/visible light absorbed by the irradiated molten sample to levels of at least one reaction component of interest in said molten polycarbonate polymer and/or oligomer sample to provide real-time monitoring of the composition of said polycarbonate during production.

27. The method of claim 26, wherein the probe is maintained at a substantially constant temperature.

28. The method of claim 26, further comprising using a high temperature probe for irradiating the polymer and collecting light transmitted from the polymer.

29. The method of claim 28, wherein the probe is immersed directly in the polymer sample.

30. The method of claim 28, wherein said probe operates at a temperature in the range from 200° C. to 400° C.

31. The method of claim 28, wherein said probe operates at a temperature in the range from 250° C. to 350° C.

32. The method of claim 28, wherein said probe operates at a temperature in the range from 260° C. to 330° C.

33. The method of claim 26, wherein the sample comprises melt polycarbonate.

34. The method of claim 33, wherein the melt polycarbonate is produced by polymerization of bisphenol A (BPA) and diphenyl carbonate (DPC).

35. The method of claim 26, wherein the step of correlating the UV/visible light absorbed by the irradiated molten sample to levels of a reaction component of interest further comprises univariate analysis.

36. The method of claim 26, wherein the step of correlating the UV/visible light absorbed by the irradiated molten sample to levels of a reaction component of interest further comprises multivariate analysis.

37. The method of claim 26, wherein the reaction component comprises uncapped phenolic end-groups.

38. The method of claim 26, wherein the reaction component comprises Fries products.

39. The method of claim 38, wherein the reaction component consists of linear Fries products.

40. The method of claim 38, wherein the reaction component consists of branched Fries products.

41. The method of claim 38, wherein the monitored absorbance comprises at least one substantially monochromatic wavelength in the range of 250 to 450 nm.

42. The method of claim 38, wherein the monitored absorbance comprises at least one substantially monochromatic wavelength in the range of 280 to 400 nm.

43. The method of claim 38, wherein the monitored absorbance comprises at least one substantially monochromatic wavelength in the range of 290 to 330 nm.

44. The method of claim 38, wherein the monitored absorbance comprises a wavelength of about 320 nm.

45. The method of claim 26, wherein the monitored absorbance is correlated to reaction components comprising Fries products and uncapped phenolic end-groups.

46. The method of claim 45, wherein the monitored absorbance comprises at least two substantially monochromatic wavelengths in the range of 250 to 450 nm.

47. The method of claim 45, wherein the monitored absorbance comprises at least two substantially monochromatic wavelengths in the range of 260 to 400 nm.

48. The method of claim 45, wherein the monitored absorbance comprises at least two substantially monochromatic wavelengths in the range of 270 to 340 nm.

49. The method of claim 26, wherein irradiation and monitoring of light absorbed is performed on combinatorial libraries of samples.

50. The method of claim 26, further comprising evaluating the monitored absorbance to determine whether any one of a set of preselected reaction components needs to be adjusted.

51. Computer readable media comprising software code for performing the method of claim 23.

52. A method for real time monitoring of molten polycarbonate composition during production comprising:

positioning an optical probe in optical contact with a stream of molten sample comprising at least one polymer and/or oligomer such that the probe maintains a substantially constant temperature;

irradiating the molten sample with at least one wavelength of substantially monochromatic radiation;

monitoring UV/visible light absorbed by the irradiated sample; and correlating the light absorbed by the irradiated sample to levels of Fries products.

53. A method for real time monitoring of molten polycarbonate composition during production comprising:

positioning an optical probe in optical contact with a stream of molten sample comprising at least one polymer and/or oligomer, such that the probe comprises a substantially constant temperature;

irradiating the molten sample with at least two wavelengths of substantially monochromatic radiation;

monitoring UV/visible light absorbed by the irradiated sample; and correlating the light absorbed by the irradiated sample to levels of Fries products and phenolic end-groups.

54. A method for real time monitoring of molten polycarbonate composition during production comprising:

positioning an optical probe in optical contact with a stream of molten sample comprising at least one polymer and/or oligomer, such that the probe comprises a substantially constant temperature;

irradiating the molten sample with at least three wavelengths of substantially monochromatic radiation;

monitoring UV/visible light absorbed by the irradiated sample; and correlating the light absorbed by the irradiated sample to levels of linear Fries products, branched Fries products, and phenolic end-groups.

55. An apparatus for in situ monitoring of molten polycarbonate polymer and/or oligomer composition comprising:

a light source;

a fiber optic transmission probe, wherein said probe transmits at least one substantially monochromatic radiation from said light source to irradiate a molten sample comprising at least one polycarbonate polymer and/or oligomer and collects light transmitted from said irradiated sample;

a spectrophotometer, wherein said spectrophotometer monitors radiation comprising UV/visible light absorbed by said irradiated sample; and a data analysis system, wherein said data analysis system correlates absorbance to at least one predetermined reaction component in said molten polycarbonate polymer and/or oligomer sample, and wherein said reaction component comprises uncapped phenolic end-groups.

56. An apparatus for in situ monitoring of molten polycarbonate polymer and/or oligomer composition comprising:

a light source;

a fiber optic transmission probe, wherein said probe transmits at least one substantially monochromatic radiation from said light source to irradiate a molten sample comprising at least one polycarbonate polymer and/or oligomer and collects light transmitted from said irradiated sample;

a spectrophotometer, wherein said spectrophotometer monitors radiation comprising UV/visible light absorbed by said irradiated sample; and a data analysis system, wherein said data analysis system correlates absorbance to at least one predetermined reaction component in said molten polycarbonate polymer and/or oligomer sample, and wherein said reaction component comprises Fries products.

57. The apparatus of claim 56, wherein said Fries products consist of linear Fries products.

58. The apparatus of claim 56, wherein said Fries products consist of branched Fries products.

59. The apparatus of claim 56, wherein said monitored absorbance comprises at least one substantially monochromatic wavelength in the range of 250 to 450 nm.

60. The apparatus of claim 56, wherein said monitored absorbance comprises at least one substantially monochromatic wavelength in the range of 280 to 400 nm.

61. The apparatus of claim 56, wherein said monitored absorbance comprises at least one substantially monochromatic wavelength in the range of 290 to 330 nm.

62. The apparatus of claim 56, wherein said monitored absorbance comprises a wavelength of about 320 nm.

63. The apparatus of claim 56, wherein said data analysis system comprises multivariate analysis.

64. An apparatus for in situ monitoring of molten polycarbonate polymer and/or oligomer composition comprising:

a light source;

a fiber optic transmission probe, wherein said probe transmits at least one substantially monochromatic radiation from said light source to irradiate a molten sample comprising at least one polycarbonate polymer and/or oligomer and collects light transmitted from said irradiated sample;

a spectrophotometer, wherein said spectrophotometer monitors radiation comprising UV/visible light absorbed by said irradiated sample; and a data analysis system, wherein said data analysis system correlates absorbance to at least one predetermined reaction component in said molten polycarbonate polymer and/or oligomer sample, and wherein said monitored absorbance is correlated to Fries products and uncapped phenolic end-groups.

65. The apparatus of claim 64, wherein said monitored absorbance comprises at least two substantially monochromatic wavelengths in the range of 250 to 450 nm.

66. The apparatus of claim 64, wherein said monitored absorbance comprises at least two substantially monochromatic wavelengths in the range of 260 to 400 nm.

67. The apparatus of claim 64, wherein said monitored absorbance comprises at least two substantially monochromatic wavelengths in the range of 270 to 340 nm.

68. The apparatus of claim 64, wherein said data analysis system comprises multivariate analysis.

69. A method for in situ monitoring of molten polycarbonate polymer and/or oligomer composition comprising:

providing an optical contact between a fiber optic probe and a stream of a molten sample comprising at least one polycarbonate polymer and/or oligomer;

irradiating the molten sample with at least one wavelength of substantially monochromatic radiation;

monitoring UV/visible light adsorbed by the molten sample; and correlating the UV/visible light absorbed by the irradiated molten sample to levels of at least one reaction component of interest in said molten polycarbonate polymer and/or oligomer sample, wherein the reaction component comprises uncapped phenolic end-groups.

70. A method for in situ monitoring of molten polycarbonate polymer and/or oligomer composition comprising:

providing an optical contact between a fiber optic probe and a stream of a molten sample comprising at least one polycarbonate polymer and/or oligomer;

irradiating the molten sample with at least one wavelength of substantially monochromatic radiation;

monitoring UV/visible light adsorbed by the molten sample; and correlating the UV/visible light absorbed by the irradiated molten sample to levels of at least one reaction component of interest in said molten polycarbonate polymer and/or oligomer sample, wherein the reaction component comprises Fries products.

71. The method of claim 70, wherein the reaction component consists of linear Fries products.

72. The method of claim 70, wherein the reaction component consists of branched Fries products.

73. The method of claim 70, wherein the monitored absorbance comprises at least one substantially monochromatic wavelength in the range of 250 to 450 nm.

74. The method of claim 70, wherein the monitored absorbance comprises at least one substantially monochromatic wavelength in the range of 280 to 400 nm.

75. The method of claim 70, wherein the monitored absorbance comprises at least one substantially monochromatic wavelength in the range of 290 to 330 nm.

76. The method of claim 70, wherein the monitored absorbance comprises a wavelength of about 320 nm.

77. The method of claim 70, wherein the step of correlating the UV/visible light absorbed by the irradiated molten sample to levels of a reaction component of interest further comprises multivariate analysis.

78. A method for in situ monitoring of molten polycarbonate polymer and/or oligomer composition comprising:

providing an optical contact between a fiber optic probe and a stream of a molten sample comprising at least one polycarbonate polymer and/or oligomer;

irradiating the molten sample with at least one wavelength of substantially monochromatic radiation;

monitoring UV/visible light adsorbed by the molten sample; and correlating the UV/visible light absorbed by the irradiated molten sample to levels of at least one reaction component of interest in said molten polycarbonate polymer and/or oligomer sample, wherein the monitored absorbance is correlated to Fries products and uncapped phenolic end-groups.

79. The method of claim 78, wherein the monitored absorbance comprises at least two substantially monochromatic wavelengths in the range of 250 to 450 nm.

80. The method of claim 78, wherein the monitored absorbance comprises at least two substantially monochromatic wavelengths in the range of 260 to 400 nm.

81. The method of claim 78, wherein the monitored absorbance comprises at least two substantially monochromatic wavelengths in the range of 270 to 340 nm.

82. The method of claim 78, wherein the step of correlating the UV/visible light absorbed by the irradiated molten sample to levels of a reaction component of interest further comprises multivariate analysis.

83. A method for in situ monitoring of molten polycarbonate polymer and/or oligomer composition comprising:

provide an optical contact between a fiber optic probe and a stream of a molten sample comprising at least one polycarbonate polymer and/or oligomer;

irradiating the molten sample with at least one wavelength of substantially monochromatic radiation;

monitoring UV/visible light adsorbed by the molten sample; and correlating the UV/visible light absorbed by the irradiated molten sample to levels of at least one reaction component of interest in said molten polycarbonate polymer and/or oligomer sample, further comprising evaluating the monitored absorbance to determine whether any one of a set of preselected reaction components needs to be adjusted.

* * * * *

UNITED STATES PATENT AND TRADEMARK OFFICE
CERTIFICATE OF CORRECTION

PATENT NO. : 6,809,817 B2
DATED : October 26, 2004
INVENTOR(S) : Radislav Alexandrovich Potyrailo, Patrick Joseph McCloskey and James Day It is certified that error appears in the above-identified patent and that said Letters Patent is hereby corrected as shown below:

Column 3,
Line 27, the word "spectra" should read -- spectra; and --
Line 58, the word "C." should read -- C. to 400° C --

Column 6,
Line 2, the phrase "Thus, the invention describes" should begin as a new paragraph Column 7,
Line 57, the phrase "As defined herein," should begin as a new paragraph Column 10,
Line 17, the phrase "and J. which provide quantitative" should read -- and J.C. Miller and J.N. Miller, *Statistics for Analytical Chemistry*, Ellis Horwood, New York, NY, pp. 101-139 (1993) ). For Example, univariate calibration models may be derived which provide quantitative --

Column 14,
Line 14, the symbol "(<)" should read -- (□) --

Signed and Sealed this

Seventeenth Day of May, 2005

JON W. DUDAS
*Director of the United States Patent and Trademark Office*